(12) United States Patent
Elpi

(10) Patent No.: US 8,250,801 B2
(45) Date of Patent: Aug. 28, 2012

(54) BIRD DECOY SYSTEM

(76) Inventor: Rich Elpi, Branford, CT (US)

( * ) Notice: Subject to any disclaimer, the term of this patent is extended or adjusted under 35 U.S.C. 154(b) by 294 days.

(21) Appl. No.: 12/629,123

(22) Filed: Dec. 2, 2009

(65) Prior Publication Data
US 2010/0139146 A1   Jun. 10, 2010

Related U.S. Application Data

(60) Provisional application No. 61/121,255, filed on Dec. 10, 2008.

(51) Int. Cl.
*A01M 31/06* (2006.01)
(52) U.S. Cl. .................................. 43/3; 43/2
(58) Field of Classification Search .......... 43/2, 3; 367/139; 340/539.1, 539.14; 455/352–354, 455/39, 60.1, 70, 90.3
See application file for complete search history.

(56) References Cited

U.S. PATENT DOCUMENTS

| | | | | | |
|---|---|---|---|---|---|
| 636,106 | A | * | 10/1899 | Biddle | 43/3 |
| 2,227,242 | A | * | 12/1940 | Boutin | 43/3 |
| 2,480,390 | A | * | 8/1949 | Thompson | 43/3 |
| 2,546,189 | A | * | 3/1951 | Keep et al. | 43/3 |
| 2,575,252 | A | * | 11/1951 | Berger | 43/3 |
| 2,747,314 | A | * | 5/1956 | McGregor | 43/3 |
| 2,835,064 | A | * | 5/1958 | Webb | 43/3 |
| 2,917,857 | A | * | 12/1959 | Muszynski | 43/3 |
| 3,034,245 | A | * | 5/1962 | Lynch | 43/3 |
| 3,538,639 | A | * | 11/1970 | Tomaro | 446/175 |
| 3,689,927 | A | * | 9/1972 | Boston et al. | 43/3 |
| 4,419,841 | A | * | 12/1983 | Huang | 446/353 |
| 4,845,873 | A | * | 7/1989 | Hazlett | 43/3 |
| 5,036,614 | A | * | 8/1991 | Jackson | 43/3 |
| 5,176,560 | A | * | 1/1993 | Wetherell et al. | 446/175 |
| 5,233,780 | A | * | 8/1993 | Overholt | 43/3 |
| 5,289,654 | A | * | 3/1994 | Denny et al. | 43/3 |
| 5,316,516 | A | * | 5/1994 | Saitoh | 446/175 |
| 5,636,466 | A | * | 6/1997 | Davis | 43/3 |
| 5,655,945 | A | * | 8/1997 | Jani | 446/175 |
| 5,752,880 | A | * | 5/1998 | Gabai et al. | 463/1 |
| 5,775,022 | A | * | 7/1998 | Sumrall et al. | 43/3 |
| 5,926,990 | A | * | 7/1999 | Okimoto | 43/2 |
| 5,960,577 | A | * | 10/1999 | Walterson | 43/3 |
| 6,170,188 | B1 | * | 1/2001 | Mathews | 43/3 |
| 6,206,745 | B1 | * | 3/2001 | Gabai et al. | 446/91 |
| 6,212,816 | B1 | * | 4/2001 | Babbitt et al. | 43/3 |
| 6,414,906 | B1 | * | 7/2002 | Gaspari | 367/139 |
| 6,591,539 | B2 | * | 7/2003 | Cosciani | 43/2 |
| 6,601,333 | B2 | * | 8/2003 | Cicoff et al. | 43/3 |
| 6,708,440 | B2 | * | 3/2004 | Summers et al. | 43/2 |
| 6,878,070 | B1 | * | 4/2005 | Wilk | 472/56 |
| 6,901,693 | B1 | * | 6/2005 | Crowe | 43/2 |

(Continued)

*Primary Examiner* — Darren W Ark
(74) *Attorney, Agent, or Firm* — Michael A. Blake

(57) ABSTRACT

A bird decoy system comprising: a transducer located on a housing; a switch located on the housing; a transmitter located within the housing, and in communication with the transducer; an electronics compartment comprising: a receiver located in the electronics compartment; a receiving antenna in communication with the receiver; a CPU located within the electronics compartment, and in communication with the receiver, the CPU configured to send a signal to cause a decoy motor to activate causing the decoy to move; a connection plug attached to the electronics compartment and in communication with the CPU; and a motorized bird decoy with a plug removeably attachable to the connection plug. A bird decoy system comprising: a decoy stand base; a decoy stand rod extending generally orthogonally from the decoy stand base; a rotatable sleeve in rotatable communication with the decoy stand rod; a bird shaped decoy fixedly attached to the rotatable sleeve.

10 Claims, 4 Drawing Sheets

U.S. PATENT DOCUMENTS

| | | | |
|---|---|---|---|
| 7,082,710 B1* | 8/2006 | Jorgenson | 43/3 |
| 7,246,569 B2* | 7/2007 | Grandy et al. | 340/573.2 |
| 7,272,905 B1* | 9/2007 | Horton | 43/2 |
| 7,362,658 B2* | 4/2008 | Hsu | 367/139 |
| 7,568,963 B1* | 8/2009 | Atsmon et al. | 446/175 |
| 7,627,977 B2* | 12/2009 | Denny | 43/2 |
| 7,671,749 B2* | 3/2010 | Alvarado | 43/2 |
| 7,690,146 B2* | 4/2010 | Jong et al. | 43/2 |
| 7,884,730 B2* | 2/2011 | Alvarado | 43/2 |
| 7,894,769 B2* | 2/2011 | Ganley et al. | 455/39 |
| 7,931,540 B2* | 4/2011 | Lokos | 472/134 |
| 8,051,598 B2* | 11/2011 | Stillwell | 43/2 |
| 2002/0163439 A1* | 11/2002 | Attimont et al. | 340/825.25 |
| 2005/0144828 A1* | 7/2005 | Lewis et al. | 43/3 |
| 2005/0160654 A1* | 7/2005 | Cosciani | 43/3 |
| 2005/0204604 A1* | 9/2005 | Noles et al. | 43/3 |
| 2006/0019605 A1* | 1/2006 | Shau | 455/66.1 |
| 2006/0150451 A1* | 7/2006 | Spielberger et al. | 40/412 |
| 2006/0276230 A1* | 12/2006 | McConnell | 455/563 |
| 2007/0037606 A1* | 2/2007 | Ganley et al. | 455/569.1 |
| 2008/0159079 A1* | 7/2008 | Dir et al. | 367/139 |
| 2009/0188148 A1* | 7/2009 | Orris et al. | 43/3 |
| 2011/0063429 A1* | 3/2011 | Contolini et al. | 348/77 |
| 2011/0088307 A1* | 4/2011 | Rice | 43/3 |
| 2011/0232154 A1* | 9/2011 | Crank, Jr. | 43/3 |

* cited by examiner

US 8,250,801 B2

BIRD DECOY SYSTEM

CROSS-REFERENCES

The present application claims the benefit of provisional patent application No. 61/121,255 filed on Dec. 10, 2008 by Rich Elpi, the entire contents of which are fully incorporated by reference herein.

BACKGROUND

Decoys which are presently available include silhouette decoys, windsock decoys, shell decoys, and full body decoys. Windsock decoys are popular where movement is desirable to give the appearance of movement like a live bird. When prevailing wind conditions are favorable the windsock decoys are inflated by the wind simulating the appearance of a full body bird. Too much wind will damage the windsock fabric or the fabric attachment to its head. The effectiveness of windsock decoys is dependent on unpredictable wind.

Most decoys, with the exception of windsock decoys, are stationary objects which give a visual appearance of a bird. However, such stationary decoys are not realistic because real animals move. In this respect, it would be desirable for an animal decoy to move in a lifelike manner, rather than be stationary.

Of special interest are decoys which simulate waterfowl, such as ducks and geese, for hunting and to attract live birds or for other uses, including aesthetic purposes such as display, gardens, and lawns. In the prior art, waterfowl decoys are known which have wings or heads that are mechanically moved by pulling a string.

There is a need for a bird decoy that is more effective and easier to cause to move than prior art bird decoys.

SUMMARY

The disclosed invention relates to a bird decoy system comprising: a remote control device, the remote control device comprising: a remote control housing; a transducer located on the housing; a switch located on the housing; a transmitter located within the housing, and in signal communication with the microphone; an electronics compartment, the electronics compartment comprising: a receiver located in the electronics compartment; a receiving antenna in signal communication with the receiver, and configured to be in signal communication with the transmitter when within range of the transmitter; a CPU located within the electronics compartment, and in signal communication with the receiver, the CPU configured to send a signal to cause a decoy motor to activate causing the decoy to move; a connection plug attached to the electronics compartment and in signal communication with the CPU.

In addition, the disclosed invention relates to a bird decoy system comprising: a decoy stand base; a decoy stand rod extending generally orthogonally from the decoy stand base; a rotatable sleeve in rotatable communication with the decoy stand rod; a bird shaped decoy fixedly attached to the rotatable sleeve; a fixed member fixedly attached to the decoy stand rod; a motor compartment fixedly attached to a fixed member; a motor shaft extending from motor compartment; a belt in communication with the motor shaft; a first gear shaft in communication with the belt, and in rotatable communication with the motor compartment; a first gear in fixed communication with the first gear shaft; a second gear in meshed communication with the first gear; a second gear shaft in fixed communication with the second gear, and in rotatable communication with the motor compartment; an arm rotatively pinned to the second gear and the rotatable sleeve.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
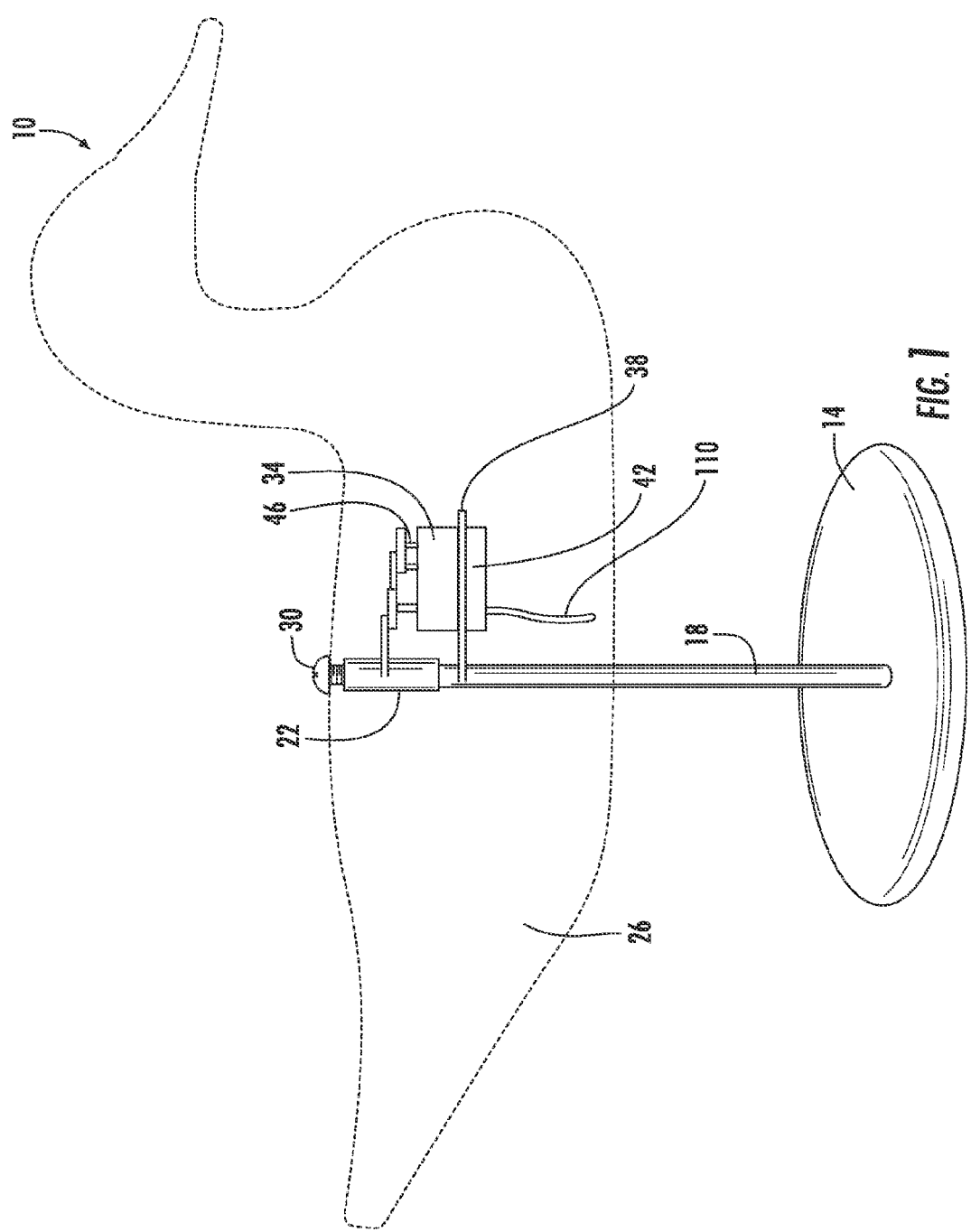
FIG. 1 is a front view of the disclosed bird shaped decoy and decoy stand.

FIG. 1 shows one embodiment of the bird decoy system 10. The bird decoy system comprises a decoy stand base 14 and a decoy stand rod 18 that extends generally orthogonally from the decoy stand base 14. A rotatable sleeve 22 is in rotatable communication with the decoy stand rod 18. The bird shaped decoy 26 is fixedly attached to the rotatable sleeve 22. The bird shaped decoy 26 may be attached to the sleeve 22 via a screw 30. The bird shaped decoy 26, and rotatable sleeve 22 are configured to rotate with respect to the decoy stand rod 18 and decoy stand base 14. A motor compartment 34 is fixedly attached to a fixed member 38, which in turn is fixedly attached to the rod 18. Also fixedly attached to the fixed member 38, is an electronics compartment 42. A motor shaft 46 extends from motor compartment 34. The motor shaft 46 communicates with the rotatable sleeve 22 via a gear/belt system that will be described further in FIG. 2.

Figure 2:
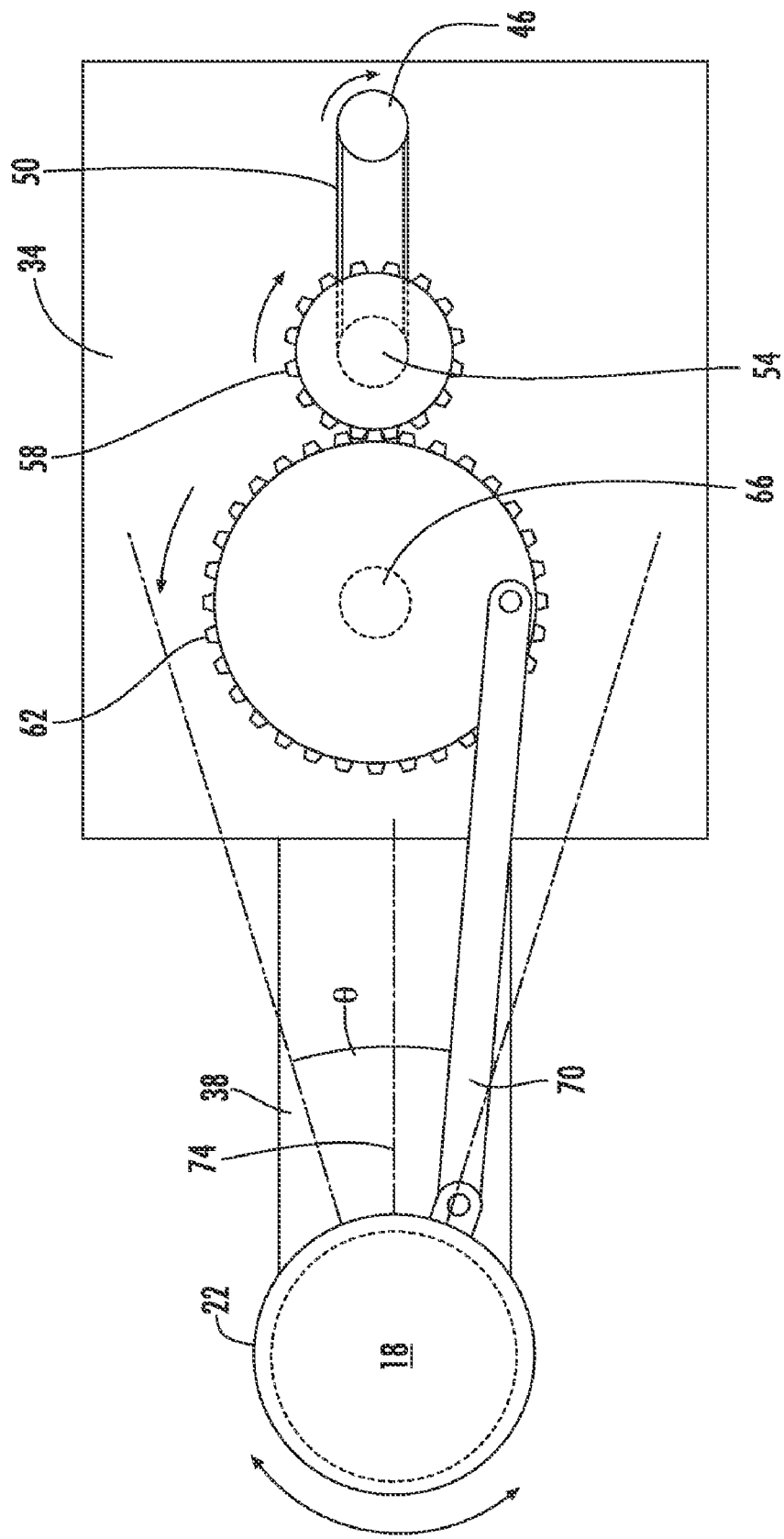
FIG. 2 is a top view of the disclosed motor compartment and rotatable sleeve.

FIG. 2 shows a top view of the motor compartment 34, rotatable sleeve 22, and gear/belt system. The decoy stand rod 18 is shown within the rotatable sleeve 22. The motor shaft 46 extends from the motor compartment 34. The motor shaft 46 is in communication with a belt 50, which is in communication with a first gear shaft 54. A first gear 58 is in fixed communication with the first gear shaft 54. The first gear shaft 54 is rotatable communication with the motor compartment 34. The first gear 58 meshes with a second gear 62. The second gear 62 is in fixed communication with a second gear shaft 66; the second gear shaft 66 is in rotatable communication with the motor compartment 34. The belt/gear system comprises the belt 50, motor shaft 46, first gear shaft 54, first gear 58, second gear shaft 66, and second gear 62. An arm 70 is rotatively pinned to the second gear 62. The arm 70 is also rotatively pinned to the sleeve 22. As the second gear 62 rotates, the pinned arm causes the sleeve 22 to rotate back and forth with respect to the decoy stand rod 18. The sleeve 22 rotates in alternatively clockwise and counterclockwise directions about a reference line 74. In one embodiment the reference line 74 may be generally coincident with the fixed member 38. The amount of rotation is given by $\theta$. In one embodiment, $\theta$ may be about 45 degrees. Because the bird shaped decoy 26 is fixedly attached to the sleeve 22, the bird shape decoy 26 also rotates with respect to the decoy stand rod 18. The belt/gear system is configured to reduce the rotational speed that is transmitted from the motor shaft 46 to the sleeve 22 (and bird shaped decoy 26). In one embodiment, a full rotative cycle of the sleeve 22 (where the sleeve rotates a total of 90 degrees in one embodiment) may take about 2 seconds.

Figure 3:
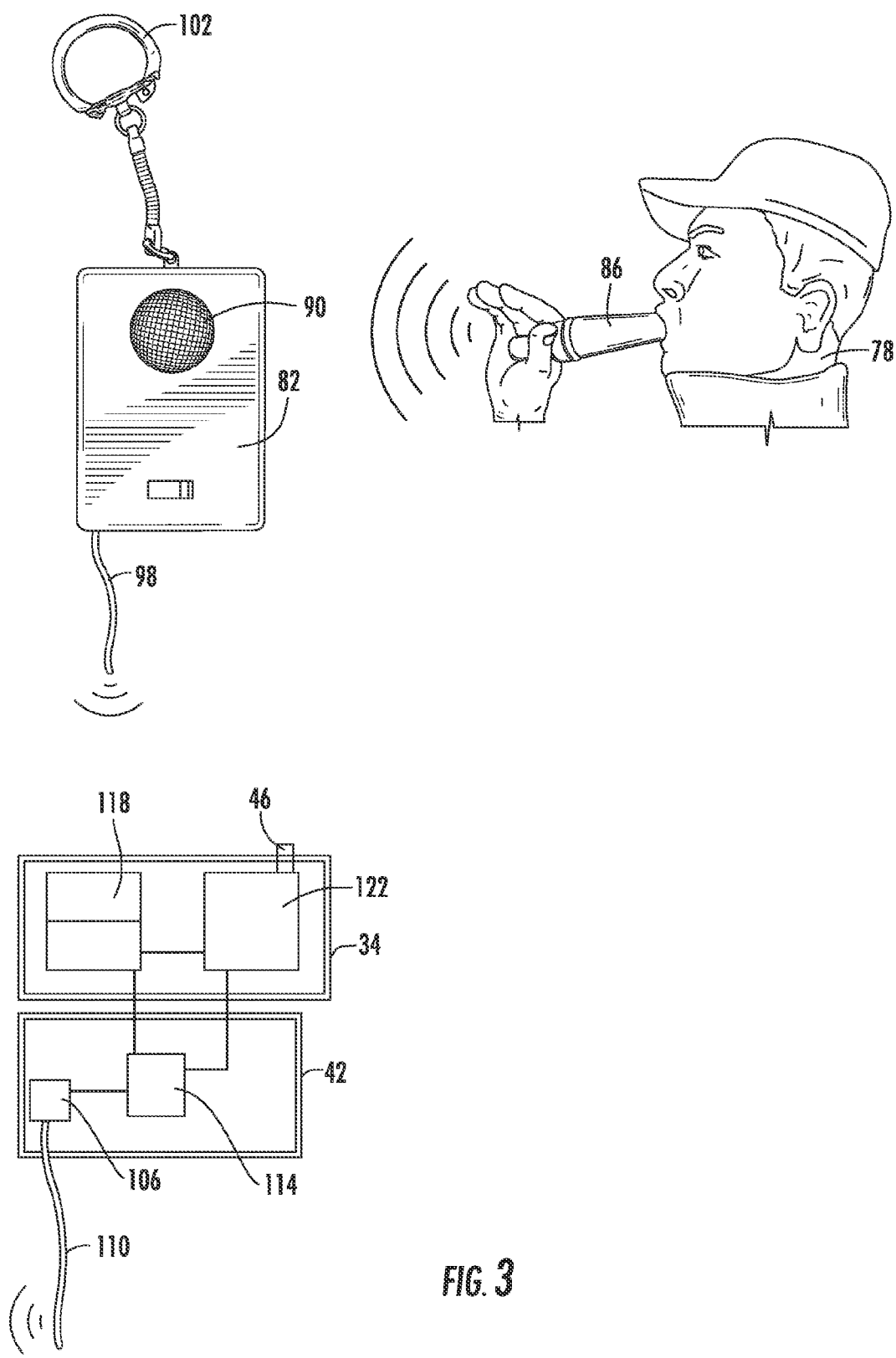
FIG. 3 is a schematic diagram of the disclosed system.

FIG. 3 is a schematic diagram showing how the disclosed system operates. A hunter 78 wears or has nearby a remote control device 82. The remote control device 82 comprises a transducer 90, an on/off switch 94, and a transmitter which is in signal communication with a transmitting antenna 98. In other embodiments, the transmitting antenna may be omitted. In other embodiments the remote control device 82 may also comprise a key ring 102. In other embodiments, the key ring may be replaced with a carabineer, clip, or any other suitable attachment device. In a preferred embodiment, the transducer 90 is a microphone. The hunter 78 makes a bird call, perhaps by using a bird call device 86. The sound of the bird call is picked up by the microphone 90 located on the remote control device 82. When the microphone 90 picks up the bird call, the transmitter transmits a signal through the transmitting antenna 98 that is picked up by a receiver 106 located in the electronics compartment 42. The microphone may be configured to only pick up certain frequency ranges, such as those produced by certain types of bird calls. A receiving antenna 110 may be in signal communication with the receiver 106. The receiver 106 is in signal communication with a CPU 114 located in the electronics compartment 42. The CPU is in communication with a power supply 118 and motor 122 located in the motor compartment 34. The motor 122 is also in signal communication with the power supply 118. In addition, the motor shaft 46 is in operational communication with the sleeve 22 and bird shaped decoy 26, such that the rotation of the motor shaft 46 causes the sleeve 22 and bird shaped decoy 26 to rotate back and forth about a reference line 74. When the receiver 106 picks up the signal from the remote control device 82, the receiver notifies the CPU 114. The CPU 114 may be programmed to activate the motor 122 for a time period P upon each discrete notification from the receiver 106. In one embodiment, the time period P may be about 15 seconds. Thus if the belt/gear system is configured to rotate the sleeve 22 and bird shaped decoy 26 once every 2 seconds, then in a 15 second period, the bird shaped decoy 26 will rotate about the reference line 74 about 7 to about 8 times. Of course the motor speed, the programming of the CPU, and the configuration of the belt/gear system may be modified to allow different periods P of time, and speed of rotation.

Figure 4:
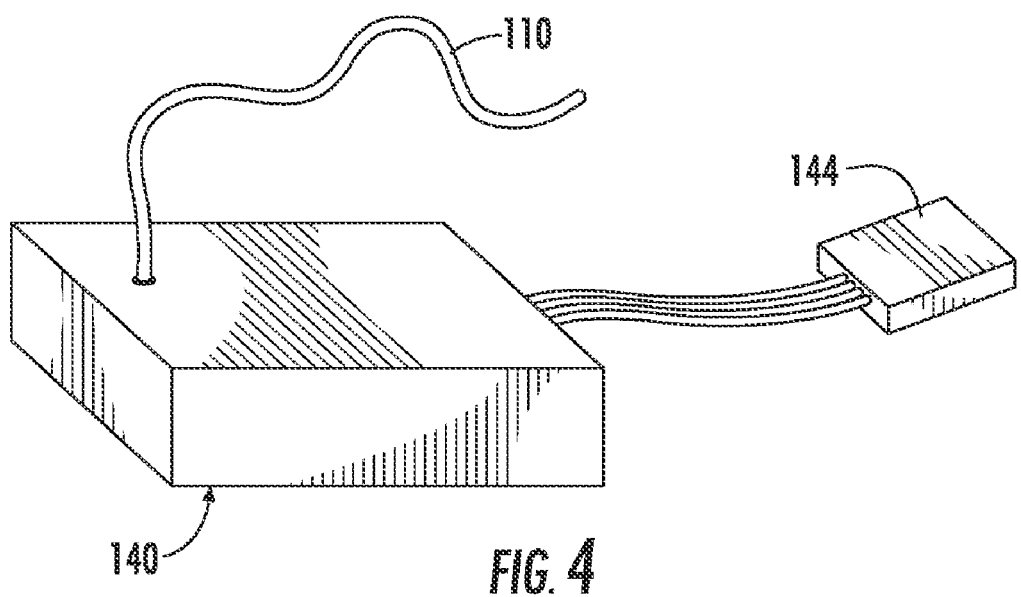
FIG. 4 is a perspective view of an electronics compartment.

This invention includes systems that can be retrofitted to already existing decoys and decoy systems, including decoy systems that may cause a decoy to move upon the manual activation of a remote control device, where the remote control device is activated by the user manually activating the remote control by pressing a button, or manually activating a switch. Such decoys may be decoys that use a stand, or may float in the water. The disclosed invention may be retrofitted onto such systems so that a sound such as a bird call, the user's voice, or a clapping sound made by the user, or any other suitable audible sound will activate a transducer located in the remote control, rather than a hunter having to manually activate the remote control. FIG. 4 shows an electronics compartment 140 for such a retrofittable system. The electronics compartment may contain a CPU 114 and a receiver 106, which are both not visible being inside the electronics compartment. A receiving antenna 110 is attached to the electronics compartment 140 and is in signal communication with the receiver 106 inside the compartment 140. A plug 144 is attached to the electronics compartment 140, the plug is in signal communication with the CPU 114. The plug is configured to plug into an off the shelf bird decoy, and thereby put into the signal communication the CPU 114 with a power source and motor located on the off the shelf bird decoy. Thus, in order to retrofit an off the shelf bird decoy, one merely removes the electronics compartment that came with the off the shelf bird decoy, and unplug the electronics compartment plug from a socket located in the bird decoy that is in signal communication with the motor and power source. Then one replaces the original electronics compartment with the electronics compartment 140 disclosed above, and attach the plug 144 to socket in the off the shelf bird decoy. Now the off the shelf bird decoy will work with the disclosed bird decoy system, and may be sound activated, in addition to being manually activated. One may use a remote control device shown in FIG. 3, or the remote control device described below in FIG. 5. The electronics compartment 140 may be waterproofed, in order to work with bird decoys that are left out in the elements or are meant to float on water and protect the electronics within the compartment 40. It should be noted that the bird decoy 26 does not have a microphone transducer. This is because a microphone used on a waterfowl bird decoy could easily become damaged by the elements, especially water or snow. Thus the microphone is located on the remote control device, and a wireless signal is transmitted from the remote control device to a receiver on the bird decoy, said receiver being more robust than a microphone which is susceptible to damage from the elements. Thus this gives the hunter greater range with respect to the decoy. The signal range between the remote control device and the decoy is much greater than the range between a microphone located on the decoy and a hunter producing an activating sound.

Figure 5:
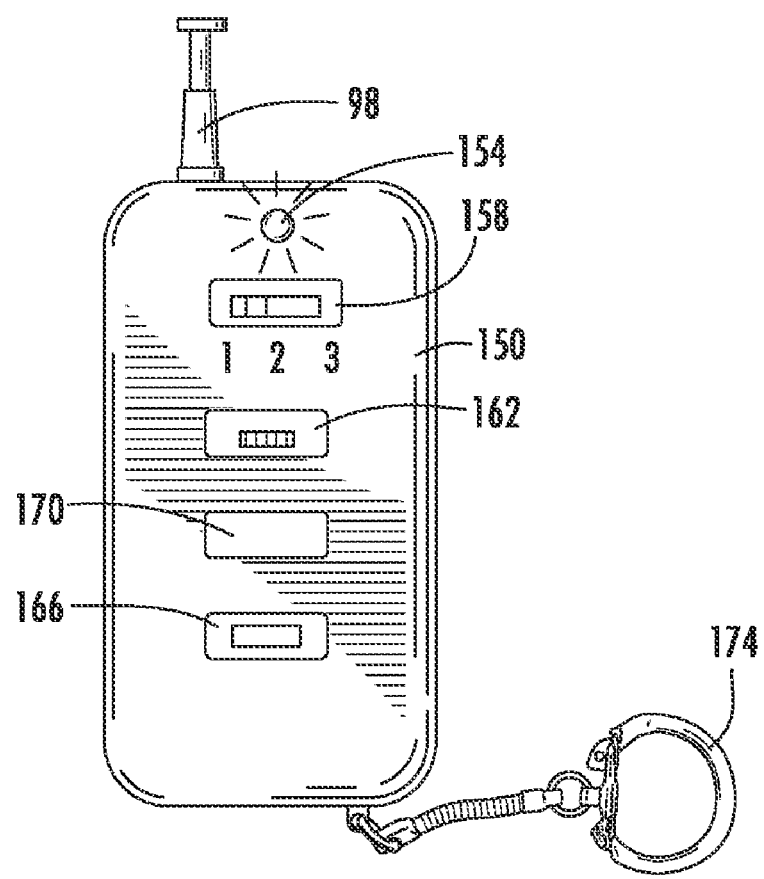
FIG. 5 is a front view of a remote control device.

FIG. 5 shows another embodiment of a remote control device 150 that is configured to communicate with the electronics in the electronics compartment 140 shown in FIG. 4, and the electronics compartment 42 shown in FIG. 3. The remote control device 150 comprises a transmitting antenna 98 (shown as a telescoping antenna but any suitable antenna may be used). The remote control device may comprise a power indicator light 154 and a first switch 158. The first switch may have three positions, the first position may be configured to activate the "sound" activation mode of the remote control device, the second position may be an "off" position, and the third position may be a "manual" position. The remote control device may also comprise a microphone 162 and a button 166 for when the remote control device is in a manual mode. There may also be an available slot 170 on the remote control device for other functions and/or accessories. In addition, the remote control device 150 may also comprise a key ring 174. In other embodiments, the key ring may be replaced with a carabineer, clip, or any other suitable attachment device. In operation, when the switch 158 is set to sound operation, then when the hunter either makes a birdcall, or otherwise makes a sound, which the remote control 150 is configured to pick up via the microphone 162, the remote control device 150 transmits a signal to the receiver 106 located in the electronics compartment 140 (or 42), and the bird decoy motion is activated as described above with respect to FIG. 3. The operational range between the receiver 106 and the transmitter may be between about 0 feet and 600 feet, and preferably about 200 feet.

The disclosed invention has many advantages. One is that a user will not have to manually press a button or throw a switch in order to make his or her decoy activate and move, rather all a user need do is make a bird call, or talk, or clap, in order to activate the transducer/microphone in the remote control, which in turn sends a signal to the bird decoy, activating the movement of the bird decoy. This saves the user from having to reach for the remote control, when his or her hands are already occupied by holding his or her weapon. This also increases the safety of the hunting environment by allowing the hunter to not have to hold on to three things, e.g. (1) the bird call, (2) the weapon and (3) the remote control device, but rather the hunter can simply hold the (1) bird call, and his or her (2) weapon, with the remote control device clipped on to his person, or gear, or located in his pocket.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A bird decoy system comprising:
   a remote control device, the remote control device comprising:
      a remote control housing;
      a transducer located on the housing;
      a switch located on the housing;
      a transmitter located within the housing, and in signal communication with the transducer;
   an electronics compartment, the electronics compartment comprising:
      a receiver located in the electronics compartment;
      a receiving antenna in signal communication with the receiver, and configured to be in signal communication with the transmitter when within range of the transmitter;
      a CPU located within the electronics compartment, and in signal communication with the receiver, the CPU configured to send a signal to cause a decoy motor to activate causing a decoy to move;
      a connection plug attached to the electronics compartment and in signal communication with the CPU.

2. The bird decoy system of claim 1, wherein the electronics compartment is configured to be plugged into an off the shelf bird decoy.

3. The bird decoy system of claim 1, where the transducer is a microphone.

4. The bird decoy of claim 1, further comprising a transmitter antenna in signal communication with the transmitter.

5. The bird decoy of claim 1, further comprising:
   an attachment means attached to the remote control device.

6. A bird decoy system comprising:
   a decoy stand base;
   a decoy stand rod extending generally orthogonally from the decoy stand base;
   a rotatable sleeve in rotatable communication with the decoy stand rod;
   a bird shaped decoy fixedly attached to the rotatable sleeve;
   a fixed member fixedly attached to the decoy stand rod;
   a motor compartment fixedly attached to the fixed member;
   a motor shaft extending from the motor compartment;
   a belt in communication with the motor shaft;
   a first gear shaft in communication with the belt, and in rotatable communication with the motor compartment;
   a first gear in fixed communication with the first gear shaft;
   a second gear in meshed communication with the first gear;
   a second gear shaft in fixed communication with the second gear, and in rotatable communication with the motor compartment; and
   an arm rotatively pinned to the second gear and the rotatable sleeve.

7. The bird decoy system of claim 6, wherein the rotatable sleeve and bird shaped decoy rotate in alternatively clockwise and counterclockwise directions with respect to the fixed member.

8. The bird decoy system of claim 7, wherein the rotatable sleeve and bird shaped decoy rotate about 45° with respect to the fixed member.

9. The bird decoy system of claim 6, wherein a full rotative cycle takes approximately 2 seconds to complete.

10. The bird decoy system of claim 6, further comprising:
    a motor compartment plug attached to the motor compartment;
    a remote control device, the remote control device comprising:
       a remote control housing;
       a transducer located on the housing;
       a switch located on the housing;
       a transmitter located within the housing, and in signal communication with the transducer;
    an electronics compartment, the electronics compartment comprising:
       a receiver located in the electronics compartment;
       a receiving antenna in signal communication with the receiver, and configured to be in signal communication with the transmitter when within range of the transmitter;
       a CPU located within the electronics compartment, and in signal communication with the receiver, the CPU configured to send a signal to cause a decoy motor to activate causing a decoy to move;
       a connection plug attached to the electronics compartment and in signal communication with the CPU, and removably pluggable into the motor compartment plug.

* * * * *